UNITED STATES PATENT OFFICE.

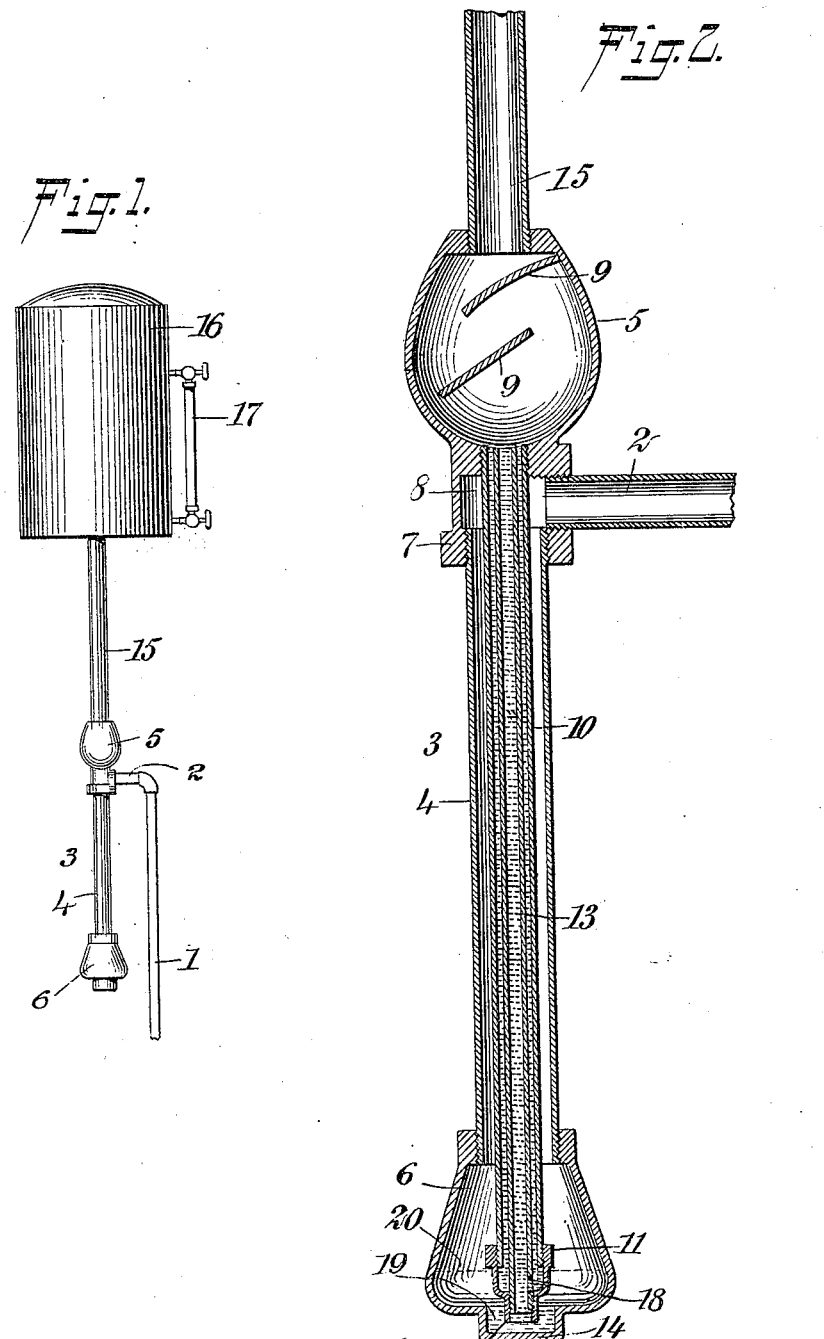

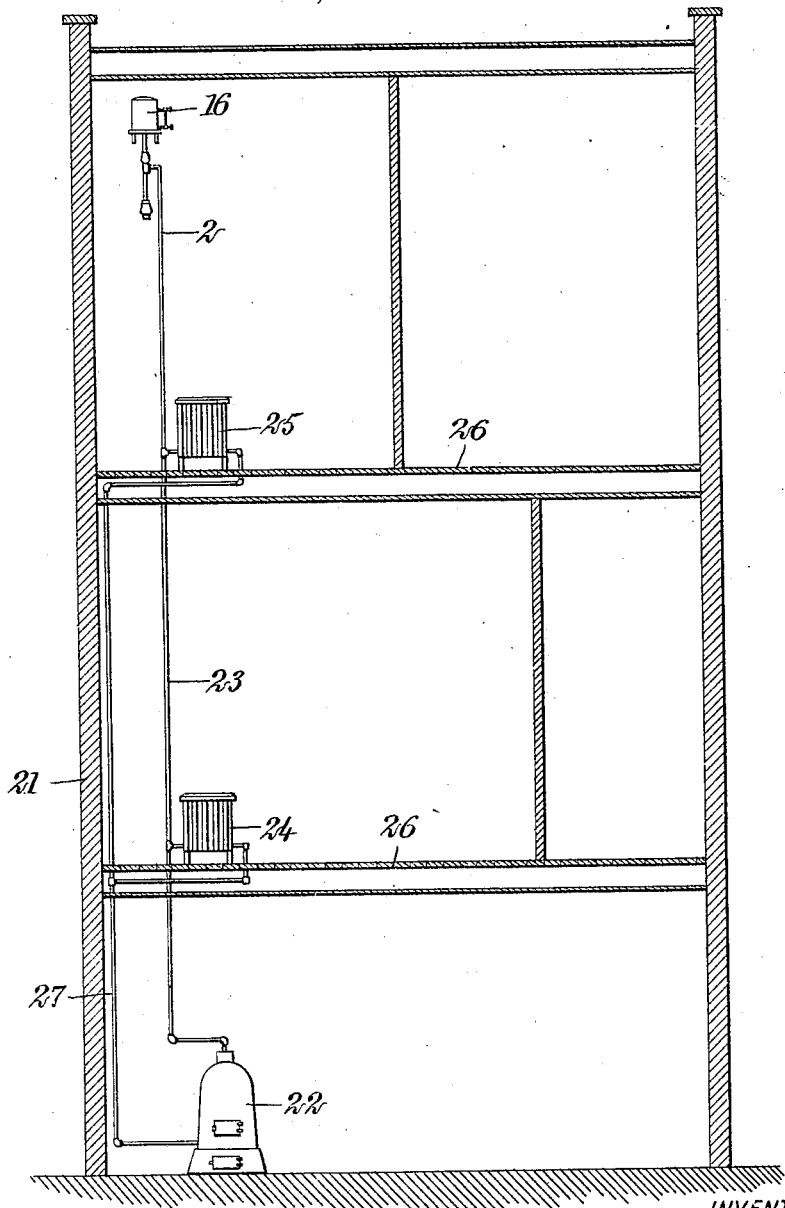

LEWIS WATSON EGGLESTON, OF APPLETON, WISCONSIN.

RELIEF DEVICE FOR WATER SYSTEMS.

No. 838,394.      Specification of Letters Patent.      Patented Dec. 11, 1906.

Application filed February 11, 1905. Serial No. 245,218.

*To all whom it may concern:*

Be it known that I, LEWIS WATSON EGGLESTON, a citizen of the United States, and a resident of Appleton, in the county of Outagamie and State of Wisconsin, have invented a new and Improved Relief Device for Water Systems, of which the following is a full, clear, and exact description.

This invention relates to relief-valves or pressure-regulators for water systems. It is intended to be used especially in connection with water-heating systems.

The object of the invention is to produce a device of the class described which will operate to maintain a substantially constant pressure and temperature for the water throughout a water system.

Reference is to be had to the accompanying drawings, forming a part of this specification, in which similar characters of reference indicate corresponding parts in all the figures.

Figure 1 is a side elevation showing my pressure-regulator or relief-valve in connection with an expansion-tank and showing a connection to a water-heating system, and Fig. 2 is a vertical central section taken through the relief-valve or regulator and on an enlarged scale. Fig. 3 is a vertical section through a building and showing a water-heating system with which my invention has been incorporated. This view is largely diagrammatic, as will appear.

Referring more particularly to the parts, 1 represents the pipe which is supposed to lead from the water-heating system. This pipe is preferably connected through a horizontal pipe connection 2 with my valve or regulator 3. The valve or regulator 3 comprises a tubular body 4, which is attached at its lower extremity to a bowl 6. The connection with the expansion-head 5 does not open communication into the interior of the same, but is made into a boss 7, which is formed with a chamber 8, into which chamber the pipe connection 2 leads. The expansion-head 5 is preferably of substantially the form shown and provided with a pair of inclined transverse baffle walls or plates 9, the purpose of which will appear more fully hereinafter. The interior of the expansion-head 5 is in communication with a main tube 10, which passes downwardly therefrom and which is preferably disposed centrally within the body 4 aforesaid. To the lower extremity of this main tube 10 a union 11 is attached, which union is formed with a reduced nipple 12, receiving a central auxiliary tube 13, which passes upwardly, and its upper extremity is located at substantially a level, as shown, with the bottom of the expansion-head 5.

As indicated in Fig. 2, the nipple 12 is open and so is the central tube 13, so that communication is opened from the interior of the bowl 6 to the interior of the expansion-head 5. The bowl 6 is preferably formed beneath the nipple 12 with a well or pocket 14, which is of reduced capacity for a purpose which will appear more fully hereinafter.

From the upper side of the expansion-head 5 an expansion-pipe 15 extends, and this leads to an expansion-tank 16, which is located at a convenient distance above the valve 3, as shown. The side of this tank 16 is preferably provided with a sight-gage 17, affording means for finding the level of the fluid contained therein.

Communication is made between the interior of the tube 13 and the main tube 10 by means of an opening 18, which is formed at the union 11.

Within the bowl 6 a quantity of mercury 19 is placed, the level of which will be substantially at the level 20 when the device is not in operation. As the pressure rises in the firing up the mercury will rise in the tube and will eventually reach the level of the expansion-head, as indicated in Fig. 2. It should be understood that as the pressure rises the mercury column in the tubes will rise very quickly. Once the mercury-level has arrived at the upper extremities of the tubes 10 and 13 a substantially constant pressure-column will be maintained, due to the relatively large volume of the head 5. From this arrangement it would follow that the device would operate to establish and maintain a substantially constant pressure in the system sufficient to support a mercury column of the height indicated. If, however, the pressure in the water system should continue to rise beyond its normal point, the mercury-level would begin to rise at the bottom of the expansion-head 5, and if this operation is continued sufficiently eventually the lower extremity of the nipple 12 would be reached by the descending water, and when this occurred the bubbles of water would pass through under the edge of the nipple 12 and rise through the tube 13. They would of course pass to the surface of the mercury in the expansion-head 5. In this way, although a substantially constant pressure in the water system would be maintained, a relief is offered for excess water forced through the relief device by the increasing pressure. Of course if this escape of water into the expansion-head continues for some time the head would become full of water and the mercury-level proportionately depressed. Eventually, if this process continued the water would pass up through the expansion-pipe 15 into the tank 16. Of course the water which would pass into and above the expansion-head would operate to assist the mercury column to support the pressure obtaining in the system. At the same time, as the water is relatively very light as compared to the mercury, a substantially normal pressure for the system will be determined by the mercury column normally supported. Under normal conditions there will be little or no water in the expansion-tank.

The presence of the central tube 13 is desirable, for the reason that when the bubbles of water pass upwardly in the manner described they will not operate to drive all of the mercury out of the connection between the bowl and head. This follows because the annular space surrounding the central tube 13 and lying within the main tube 10 will not be subjected to the violent disturbance due to the bubbles, and consequently a constant column of mercury will be maintained in this space.

Evidently the baffle-plates 9 afford means for preventing the mercury passing upwardly into the expansion-pipe 15 on account of the violent bubbling or ebullition which will take place at the mercury-level in the expansion-head. As the operation of my system depends, primarily, upon the height of the mercury column and not that of the water, it is immaterial whether the expansion-tank 16 be placed at a great elevation or not. It is also immaterial what is the position of the regulating device with respect to the water system. It may be located in a basement or cellar or in a garret, as may be desired. In one aspect this relief device may be considered as a mercury seal, affording means for supporting any pressure desired, through which seal displaced water may escape into the expansion-tank.

It has been suggested above that the relief device may be placed in any position with relation to the water system—that is, at any elevation with respect to the same; but of course it should be understood that when the device is in a depressed position with respect to the water system the mercury column will be necessarily increased in height so as to support additional pressure arising from the height simply due to the height of the water-level in the pipe system.

While I prefer to use mercury in connection with the relief device on account of its very high specific gravity, any other fluid substance of high specific gravity may be used in the same connection. Special attention is called to the feature of placing the expansion-tank beyond the relief device, which enables the water expelled from the system to return automatically as soon as the pressure in the system becomes sufficiently reduced. In this connection it should be understood that if the unusually high pressure which may occur in the system is not maintained the mercury which is forced into the body of the tube 10 will commence to return to the bowl 6. In this way the bottom of the water column above the mercury column will eventually come to the low level of the edge of the lip 12, and this water will escape under the lip and return to the bowl above the surface of the mercury therein.

The presence of the pocket 14, referred to above, should now be understood to be desirable, for by reason of its reduced capacity the depth of mercury at the lower mouth of the tube 13 will be longer maintained. This is desirable, as it virtually increases the quantity of mercury available for the column.

In Fig. 3, 21 represents a building in which a water-heating system is provided, the said system comprising a water-heater 22 of any suitable form from which a riser-pipe 23 extends upwardly leading to radiators 24 and 25, placed on the floors 26. The riser-pipe 23 extends above the radiators and connects with the pipe 2 aforesaid, which leads to the expansion-tank 16. From the radiators 24 and 25 a return-pipe 27 conducts the water back to the heater.

Having thus described my invention, I claim as new and desire to secure by Letters Patent—

1. A relief device of the class described, comprising a pair of tubes in communication at their lower extremities, a bowl containing a mercury-bath in which said tubes dip, and means for admitting fluid-pressure to said bowl.

2. A relief device of the class described, comprising a tubular body, a bowl attached to the lower extremity thereof and adapted to contain mercury, a pair of tubes communicating at their lower extremities and dipping in said bowl, means for admitting fluid-pressure into said bowl, and a head receiving the upper extremities of said tubes and communicating therewith.

3. A relief device adapted to be used with a water-pressure system, and comprising a pair of tubes, and a mercury-bath in which said tubes dip, one of said tubes having an inlet depressed below the normal level of said bath and through which water from said system may escape, said tubes being adapted to maintain normally a mercury column therein.

4. A relief device adapted to be used with a water-pressure system, comprising in combination a substantially vertical tube, an inner tube arranged therein, a union connecting said tubes at their lower extremities, said inner tube having communication with said outer tube, a mercury-bath into which said union dips, and means for subjecting the surface of said bath to the pressure of said system whereby a mercury column may be supported in said tubes.

5. A relief device adapted to be used in a water-pressure system, comprising in combination a tubular body, a bowl attached to the lower extremity thereof and containing mercury, a pair of tubes within the tubular body and in which a mercury column may rise from said bowl, an expansion-head attached to the upper extremity of said tubular body, and communicating with the interior of said inner tubes, and means for subjecting the surface of said mercury in said bowl to the pressure of said water system.

6. A pressure and relief attachment for a pressure hot-water heating system, comprising a receptacle containing a mercury-well, a chamber in communication with said receptacle, a tube extending from said well to the chamber to allow the formation of a mercury column under pressure from the system, the arrangement being such that a predetermined pressure may be maintained in the system, and water may pass from and return to the system through the mercury under sufficient variation from said pressure.

7. A relief device of the class described, comprising a tube to contain a mercury column, means for connecting said tube to a water system whereby the pressure of said system may form and support said column, and an extension beyond said tube into which water may escape through said mercury column, and from which the escaped water may return through said mercury column.

8. In a device of the class described, a mercury-chamber, a boiler connection extending laterally from the mercury-chamber, a bulb supported above the latter, a pipe depending from said bulb into the mercury-chamber, and a tank connection at the upper end of the bulb the parts being so arranged as to allow water to pass and repass through the mercury.

9. In a device of the class described, a mercury-chamber, a boiler connection extending laterally from the chamber, a bulb supported above the latter, a pipe depending from said bulb into the mercury-chamber, a tank connection at the upper end of the bulb, and a plurality of deflectors within the latter, the parts being so arranged as to permit water to pass and repass through the mercury.

In testimony whereof I have signed my name to this specification in the presence of two subscribing witnesses.

LEWIS WATSON EGGLESTON.

Witnesses:
W. R. WATERS,
B. M. CHAPPELL.